(12) United States Patent
Northcott et al.

(10) Patent No.: US 9,544,052 B2
(45) Date of Patent: Jan. 10, 2017

(54) SIMPLE LOW COST TIP-TILT WAVEFRONT SENSOR HAVING EXTENDED DYNAMIC RANGE

(71) Applicant: AOptix Technologies, Inc., Campbell, CA (US)

(72) Inventors: Malcolm J. Northcott, Felton, CA (US); J. Elon Graves, Los Gatos, CA (US); Siegfried Fleischer, Campbell, CA (US); Paolo Zambon, Campbell, CA (US); Jeffrey Tuttle, Campbell, CA (US); Yu Chun Chang, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 0 days.

(21) Appl. No.: 13/785,441

(22) Filed: Mar. 5, 2013

(65) Prior Publication Data
US 2014/0248048 A1 Sep. 4, 2014

Related U.S. Application Data

(60) Provisional application No. 61/771,851, filed on Mar. 2, 2013.

(51) Int. Cl.
*H04B 10/08* (2006.01)
*H04B 17/00* (2015.01)
*H04B 10/112* (2013.01)

(52) U.S. Cl.
CPC .................. *H04B 10/1125* (2013.01)

(58) Field of Classification Search
CPC H04B 10/112; H04B 10/1121; H04B 10/1127
(Continued)

(56) References Cited

U.S. PATENT DOCUMENTS 3,893,129 A * 7/1975 Endo ................. G11B 7/08
219/121.62
5,229,889 A * 7/1993 Kittell .................. G02B 26/06
250/201.9

(Continued)

OTHER PUBLICATIONS

Spiricon, Hartmann Wavefront Analyzer Tutorial, 2004, Version 1.33, pp. 3-12.*

(Continued)

*Primary Examiner* — David Payne
*Assistant Examiner* — Pranesh Barua
(74) *Attorney, Agent, or Firm* — Fenwick & West LLP (57) ABSTRACT

A low cost, high reliability system for correcting aberrations in optical signals is disclosed. A foreoptic assembly, such as a telescope, receives an incoming optical signal and directs it to an active optical element, such as a fast steering mirror. The incoming optical signal is diffracted by a diffractive optical element to shape the image that is formed at a wavefront sensor, such as a quad-cell. The wavefront sensor measures a tip-tilt aberration of the incoming optical signal and the active optical element is adjusted to correct the measured aberration. An outgoing optical signal can be transmitted along substantially the same optical path as the incoming optical signal, but in the opposite direction. Thus, the aberration measured from the incoming optical signal can be automatically accounted for in the outgoing optical signal.

12 Claims, 8 Drawing Sheets

(58) Field of Classification Search
USPC .......................................................... 398/25
See application file for complete search history.

(56) References Cited

U.S. PATENT DOCUMENTS

| | | | | |
|---|---|---|---|---|
| 6,563,572 B1* | 5/2003 | Radick | ...................... | G01J 9/00 356/121 |
| 7,210,628 B2* | 5/2007 | Kiefer | .................. | G11B 7/1362 235/454 |
| 7,272,322 B2* | 9/2007 | Tegge, Jr. | .......... | H04B 10/1125 398/119 |
| 7,289,736 B1* | 10/2007 | Graves | ................ | H04B 10/112 398/119 |
| 7,400,457 B1* | 7/2008 | Cayer | ................ | G02B 27/0927 359/709 |
| 7,593,641 B2* | 9/2009 | Tegge, Jr. | ............ | H04B 10/118 398/118 |
| 7,616,897 B2* | 11/2009 | Graves | ............... | H04B 10/1121 398/119 |
| 7,619,191 B1* | 11/2009 | Zou | ........................... | G01J 9/00 250/201.9 |
| 7,864,333 B1* | 1/2011 | Olczak | ................. | G02B 27/286 356/491 |
| 8,007,141 B2* | 8/2011 | Matsubara | ........... | G02B 5/1809 359/558 |
| 8,009,283 B2* | 8/2011 | LaFortune | ............ | G01J 1/4257 250/216 |
| 8,362,410 B2* | 1/2013 | King | ...................... | G02B 26/06 250/201.9 |
| 8,483,571 B2* | 7/2013 | McColloch | .......... | G02B 6/4206 359/629 |
| 8,731,013 B2* | 5/2014 | Byren | ................... | F41H 13/005 372/26 |
| 2004/0031906 A1* | 2/2004 | Glecker | .................... | G01J 3/02 250/208.1 |
| 2004/0141752 A1* | 7/2004 | Shelton | ............. | H04B 10/1127 398/120 |
| 2006/0022115 A1* | 2/2006 | Byren | .................... | G02B 26/06 250/201.9 |
| 2006/0175528 A1* | 8/2006 | Greenaway | ............... | G01J 9/00 250/201.9 |
| 2007/0115525 A1* | 5/2007 | Heor | ..................... | G11B 7/131 369/112.08 |
| 2008/0030821 A1* | 2/2008 | Minabe | .................... | G03H 1/16 359/29 |
| 2009/0009838 A1* | 1/2009 | Masuda | ............... | G02B 26/127 359/204.1 |
| 2009/0109534 A1* | 4/2009 | Gurevich | ............. | G02B 5/1814 359/558 |
| 2009/0174943 A1* | 7/2009 | Takagi | ............... | G03B 21/2033 359/558 |
| 2010/0200286 A1* | 8/2010 | Melcher | .................. | G02F 1/155 174/261 |
| 2012/0038934 A1* | 2/2012 | Miyasaka | ............ | G02B 5/1861 356/610 |
| 2012/0093297 A1* | 4/2012 | Kondoh | ................... | G01D 5/38 378/145 |
| 2013/0096542 A1* | 4/2013 | Palanker | ................. | A61F 9/008 606/4 |

OTHER PUBLICATIONS http://www.ctio.noao.edu/~atokovin/tutorial/part3/wfs.html, Wavefront Sensors.*

* cited by examiner

SIMPLE LOW COST TIP-TILT WAVEFRONT SENSOR HAVING EXTENDED DYNAMIC RANGE

CROSS-REFERENCE TO RELATED APPLICATIONS

This application claims the benefit of U.S. Provisional Patent Application No. 61/771,851, entitled "Simple Low Cost Tip-Tilt Wavefront Sensor Having Extended Dynamic Range," filed on Mar. 2, 2013, which is hereby incorporated by reference in its entirety.

BACKGROUND

This invention relates generally to Free Space Optical (FSO) communications, and in particular to correction of tip-tilt aberrations in FSO signals.

FSO performance depends upon several factors, including the atmospheric seeing condition, weather, and the local environment. Atmospheric seeing is generally quantified by the length over which the phase of an optical wavefront in the propagation path has 1 radian RMS variance, as described by the Fried parameter, $r_o$. Atmospheric seeing can also be expressed as an angle (e.g., in radians), determined by the mean beam divergence caused by the atmosphere.

Atmospheric seeing is a function of the atmospheric refractive index structure constant, $C_n^2$ along the path of beam propagation. The effects of atmospheric seeing on an FSO signal presents an effective limiting aperture size of $r_o$ for an arriving wavefront, leading to degraded spatial resolution. For a telescope with a physical aperture diameter that is less than the effective limiting aperture size ($D < r_o$), diffraction dominates. In cases where the telescope's physical aperture diameter is approximately equal to the effective limiting aperture size ($D \sim r_0$), first order Zernike polynomial (tip-tilt) aberrations dominate the aberration error in an FSO signal. When the telescope's physical aperture diameter is significantly larger than the effective limiting aperture size ($D \gg r_0$), the aberration error in an FSO signal is dominated by the effects of high order aberrations.

Consequently, there are three domains to consider. 1). Diffraction limited. When $D < r_o$ the effects of the telescope's physical aperture size dominate over the effects of atmospheric seeing. Thus, correcting for atmospheric seeing effects is of little to no value. 2). Good seeing conditions. This is generally defined as the ratio of the telescope's physical aperture diameter (D) and the effective limiting aperture size ($r_o$) being greater than about 1 (i.e., not diffraction limited) and less than about 5. Under good seeing conditions, tip-tilt aberrations, corresponding to motion of the centroid of the FSO signal, are the major contributors to the aberration error. According to one analysis, for pure, well developed atmospheric turbulence, tip-tilt aberrations comprise 87% of the total aberration error. Thus, under good seeing conditions, compensation for tip-tilt type aberrations can provide a dramatic improvement in obtainable resolution. 3. Bad seeing conditions. This is generally defined as the ratio of the telescope's physical aperture diameter (D) and the effective limiting aperture size ($r_o$) being greater than about 5. In bad seeing conditions, higher order aberration contribute significantly to the aberration error, and thus correcting for just the tip-tilt aberrations does not provide a significant improvement in obtainable resolution.

SUMMARY

A low cost, high reliability system for correcting aberrations in optical signals is disclosed. In one embodiment, the system includes a foreoptic assembly, a diffractive optical element, a wavefront sensor, and an active optical element. The foreoptic assembly receives an incoming optical signal and directs it to the active optical element. The incoming optical signal propagates to a diffractive optical element (DOE) that diffracts the incoming optical signal to shapes the image that is formed at the wavefront sensor. The wavefront sensor measures an aberration of the incoming optical signal and the active optical element is adjusted to correct the measured aberration. In another embodiment, an outgoing optical signal is transmitted along substantially the same optical path as the incoming optical signal, but in the opposite direction. Thus, the aberration measured from the incoming optical signal is automatically accounted for in the outgoing optical signal.

Other features and objectives of the present invention will be apparent from the following description and claims and are illustrated in the accompanying drawings, which by way of illustration, show preferred embodiments of the present invention and the principles thereof. Other embodiments of the invention embodying the same equivalent principles may be used and structural changes may be made as desired by those skilled in the art without departing from the present invention or purview of the appended claims.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview and Benefits

Adaptive optics systems that compensate for wavefront aberrations typically represent a significant production cost to Free Space Optical (FSO) system manufacturers. For example, a typical adaptive optics system may include a deformable mirror to perform wavefront correction, lenses, mirrors, beamsplitters, detectors, amplifiers, a control loop, and the like. Thus, a low cost, reliable, aberration correction system is desirable.

A low cost, high reliability system for correcting aberrations in optical signals is disclosed. The system uses a tip-tilt correction system that is more cost effective than a higher-order correction system. Such a system trades-off a higher level of correction for a lower production cost. Such a system also has a better link margin, meaning that it can operate efficiently in a wide range of environmental conditions. Due to the reduced cost of a tip tilt correction system vs. a higher order correction system, budget that would have been spent on a higher order correction system can instead be spent to improve other aspects of the system. For example, transmit and receive amplifier performance, error correction, and data coding can all be improved. The result is improved transceiver immunity to atmospheric induced aberrations at price that is viable for commercial production and sale.

If an inexpensive quad-cell is used for tip-tilt wavefront sensor (WFS) measurement, then the angle responsivity of the sensor can vary widely, by a factor of 10 or more, as the spot sizes changes due to changes in atmospheric seeing conditions. If a diffraction limited spot size is smaller than the manufacturing gaps between adjacent quadrants of the quad-cell, then the signal can be lost, and linearity compromised. In one embodiment, to account for this the spot size is increased above the diffraction limit. However, increasing the spot size to be larger than the largest spot size expected to result from aberrations caused by atmospheric seeing reduces the responsivity variation of the quad-cell, at the expense of reducing the tip-tilt signal-to-noise ratio (SNR) under good seeing conditions.

These two boundary conditions guide how the system is constructed. Firstly, intensity fluctuations in the incoming signal should not generate erratic tip-tilt corrections in the system. For example, such fluctuations should not shift the centroid position of the incident signal on the quad-cell. Atmospheric turbulence and scintillation will generate intensity fluctuations over long propagation distances, potentially adding noise to the incoming signal. If such noise resulted in erratic tip-tilt corrections, pointing accuracy would be decreased, and power consumption would be increased. Secondly, higher order phase aberrations should not induce spurious tip-tilt signals in the system. Thirdly, if a component is added to the system to create an aberration and increase spot size, it should be sufficiently complex such that the probability of the atmosphere generating a conjugate phase front is sufficiently low.

Numerous options are available to increase the spot size while still meeting these boundary conditions. One option is to add an aberration such as defocus or astigmatism. However, this can induce an erratic tip-tilt signal due to intensity fluctuations in the pupil plane. This issue can be mitigated by using two quad-cells, at the expense of increased system complexity and system cost. A second option is to use a small gap quad-cell, but this adds significant cost to the system. This also does not address the issue of varying responsivity of the system. Another option is to use a long lateral diffusion cell to increase the spot size electronically. However, lateral diffusion length is not achievable for indium gallium arsenide technology (~1550 nanometers wavelength), and is thus of limited applicability. A further option is to use a Position Sensitive Detector (PSD) instead of a quad-cell as the wavefront sensor. However, noise is prohibitive at low light levels and the results can be highly temperature dependent, which is undesirable for an FSO system designed for outdoor use. Yet another option is to add a high order random aberration with an engineered diffuser to increase the spot size by a known diffusion angle. The output from such diffusers tends to have a Gaussian envelope, which compromises the linearity of the system.

In one implementation, a Diffractive Optical Element (DOE) is used to appropriately shape the image formed by an imaging lens from an incoming signal at the wavefront sensor. Alternatively, the DOE itself may form an image of the desired shape from the incoming signal. The DOE modifies the wavefront by segmenting and redirecting the segments through the use of interference and phase control. The image as shaped by the DOE is of substantially invariant dimensions (e.g., a 200 micron by 200 micron square), regardless of the spot size of an incoming FSO signal that is illuminating the DOE. Use of a DOE increases the spot size without a prohibitive reduction in the signal-to-noise ratio or the control loop dynamic range. The DOE option also reduces the system's susceptibility to aliasing and minimizes the impact of atmospheric phase distortions on the tip-tilt reading of the WFS. Further advantages of this approach include: spreading the image at the quad-cell WFS to reduce aliasing from higher order aberration; reducing responsivity variation due to varying atmospheric seeing conditions; a high resistance to variations in the illumination of the telescope pupil; a stable feedback transfer function for FSM tip-tilt wavefront correction; and keeping manufacture costs low due to the use of simple, readily available components.

Incoming Signal

Figure 1:
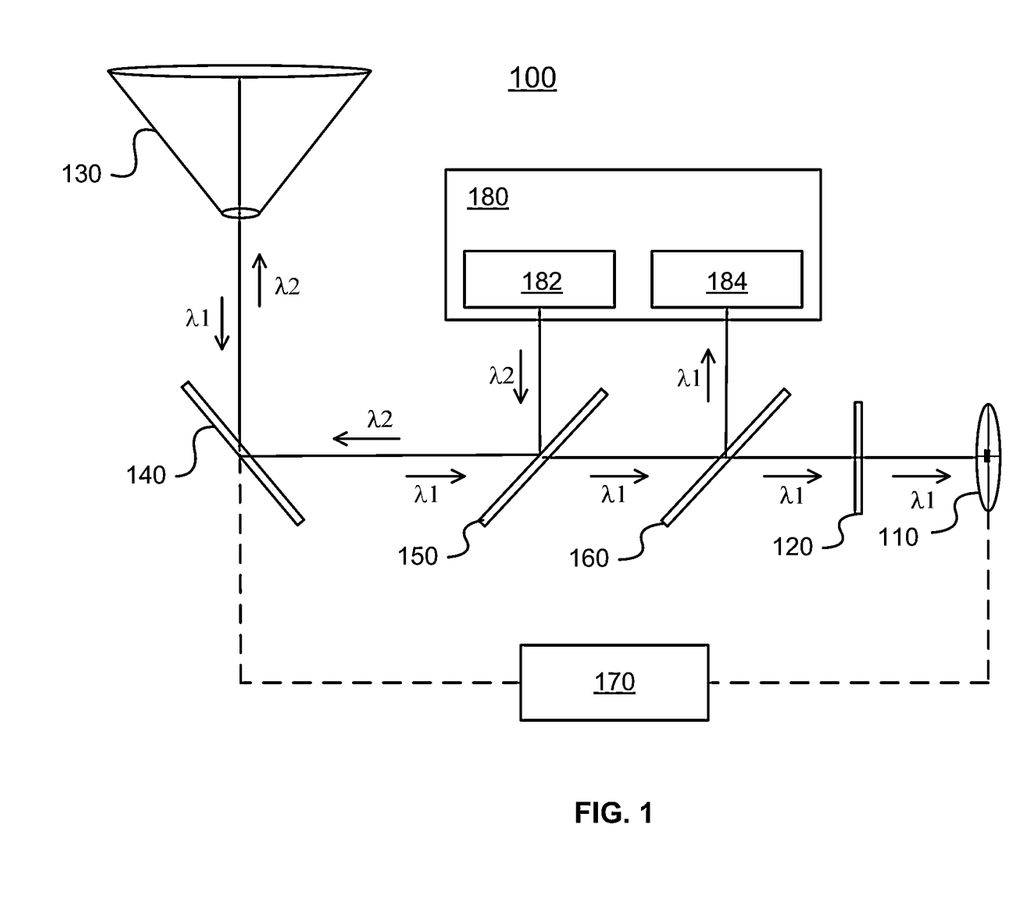
FIG. 1 is an illustration of a system to compensate for aberrations in an FSO signal, according to one embodiment.

FIG. 1 illustrates one embodiment of a system 100 for correcting aberrations in optical signals. The illustrated system 100 includes a foreoptic assembly 130, a fast steering mirror (FSM) 140, a dichroic mirror 150, a beam splitter 160, a DOE 120 and a primary quad-cell 110. The illustrated system 100 also includes a controller 170 and a FSO data processing unit 180.

The foreoptic assembly 130 receives an incoming FSO signal with a wavelength, λ1. In one embodiment, the foreoptic assembly 130 comprises a modified commercial Schmidt-Cassegrain afocal telescope. Further, foreoptic assembly 130 can be athermalized to mitigate environmental thermal effects which can otherwise impact boresight error pointing and the ability of the system 100 to correct for aberrations over its full dynamic range.

The incoming FSO signal is directed towards the primary quad-cell 110 by the FSM 140. In the embodiment shown, the incoming FSO signal propagates to the dichroic mirror 150, which is configured such that the incoming FSO signal at wavelength λ1 passes through substantially unperturbed.

The incoming FSO signal then propagates to the beam splitter 160. The incoming FSO signal is partially reflected by the beam splitter 160, with the reflected portion propagating to a data input port 184 of the FSO data processing unit 180. The FSO data processing unit 180 processes the incoming FSO signal in an appropriate manner, as determined by the specific implementation and function to be performed. For example, if the system 100 is part of a relay node in a communications network, the FSO data processing unit 180 passes the incoming FSO signal to a second data processing unit (not shown), via a multimode fiber connection, for retransmission. In one embodiment, the data input port 184 includes an optical detector that converts the incoming FSO signal into an electronic signal suitable for processing by an electronic data processing system, such as a computer.

The non-reflected portion of the incoming FSO signal passes through the beam splitter 160 substantially unperturbed and propagates to the DOE 120. The DOE 120 diffracts the incoming FSO signal resulting in a particular shape of image being incident on the primary quad-cell 110. Different configurations of DOE 120 that result in different shaped images may be used in different embodiments. For example, in one embodiment, the DOE 120 is a hologram that results in a single square diffraction spot with 200 micron side-length. Thus, regardless of variation in the incoming beam size that is incident on the DOE 120, due to atmospheric seeing (and other causes of beam spread), the diffraction spot incident on the primary quad-cell 110 will be of substantially uniform dimensions.

The primary quad-cell 110 outputs the intensity of illumination measured by each of its four quadrants to the controller 170. The relative illumination levels between each quadrant of the primary quad-cell 110 can be used to derive an approximation of the total magnitude of tip-tilt aberrations present in the incoming FSO signal. This approximation is sent to the controller 170 and used to modulate the FSM 140 in order to correct for the tip-tilt aberrations. In one embodiment, the controller 170 derives x axis and y axis components of the total tip-tilt aberration present in the incoming FSO signal from the relative illumination levels of each of the quadrants of the primary quad-cell 110. For example, the relative difference in illumination between the top two quadrants and the bottom two quadrants of the quad cell can be used to determine the y axis component of the total tip tilt signal. Similarly, the relative difference in illumination between the left two quadrants and the right two quadrants of the quad cell can be used to determine the x axis component of the total tip tilt signal. The x axis component and the y axis component are used to modulate the x axis alignment and y axis alignment of the FSM 140, respectively.

Figure 2:
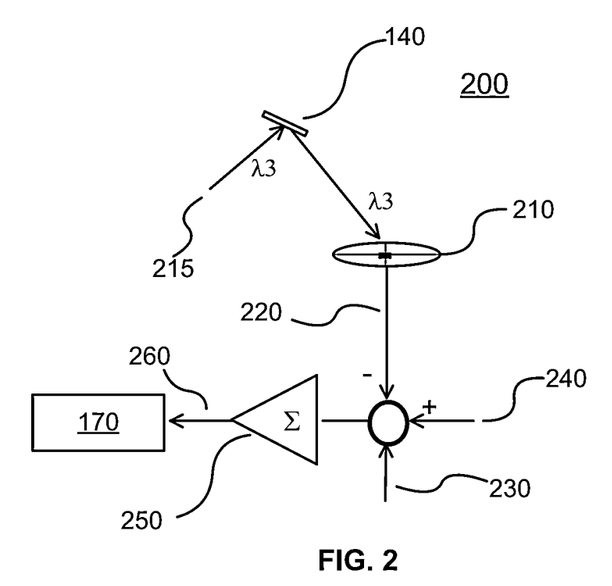
FIG. 2 is an illustration of a system to measure the position of a fast steering mirror, according a one embodiment.

FIG. 2 illustrates a system 200 to measure the position of the FSM 140, according to one embodiment. To allow the position of the FSM 140 to be measured by controller 170, a reference beam 215, generated by a LED operating at a wavelength λ3, is reflected off of the FSM 140. The position of the centroid of the reference beam is measured by a second quad-cell 210. The output 220 from the second quad-cell 210 is representative of movement in the centroid of the reference beam 215 in response to changes in orientation of the FSM 140 made during tip-tilt correction. In measuring the absolute position of the FSM 140, three contributing factors are considered: 1) a centroid position 240 of the light distribution incident upon the primary quad-cell 110; 2) a controllable offset 230 adjusted to remove any residual biases in the system 200; and 3) the output from the second quad-cell. These three factors are algebraically summed by an amplifier 250 to generate a closed loop error signal 260 which is applied back to the controller 170 in order to stabilize the image centroid at the primary quad-cell 110.

Outgoing Signal

Referring again to FIG. 1, in one embodiment, a pair of substantially aligned foreoptic assemblies 130 are used, one to receive the incoming FSO signal and the other to send an outgoing FSO signal. Alternatively, the foreoptic assembly 130 is bidirectional, meaning that as well as receiving the incoming FSO signal at a first wavelength, λ1, the foreoptic assembly also transmits an outgoing FSO signal at a second wavelength, λ2.

In the embodiment shown, the outgoing FSO signal originates from a transmit data port 182 of the FSO data processing unit 180. The outgoing FSO signal may be generated by the FSO data processing unit 180 (e.g., by a transceiver/transmitter as a response to a received FSO signal) or it may be received from an external source (e.g., from a coupled transceiver as part of a relay node, via a multimode fiber). The outgoing FSO signal propagates to the dichroic mirror 150, which is configured such that outgoing FSO signal is reflected, in contrast to the incoming FSO signal which is transmitted through the dichroic mirror substantially unperturbed, as described previously. The outgoing FSO signal then propagates to the FSM 140 along substantially the same path as the incoming FSO signal (but in the opposite direction).

The outgoing FSO signal is directed towards the foreoptic assembly 130 by the FSM 140. Thus, the outgoing FSO signal is transmitted by the foreoptic assembly 130 along substantially the same path as the incoming FSO signal. As FSM 140 has been aligned to correct for the tip-tilt aberrations measured in the incoming FSO signal, this correction is also applied to the outgoing FSO signal. Consequently, less (or even no) correction for tip-tilt aberrations will be required by a remote transceiver that receives the outgoing FSO signal, as atmospheric conditions are substantially invariant when viewed over timescales corresponding to FSO signal transmission (i.e., on the order of microseconds).

DOE Improves System Responsivity and Stability

Figure 3:
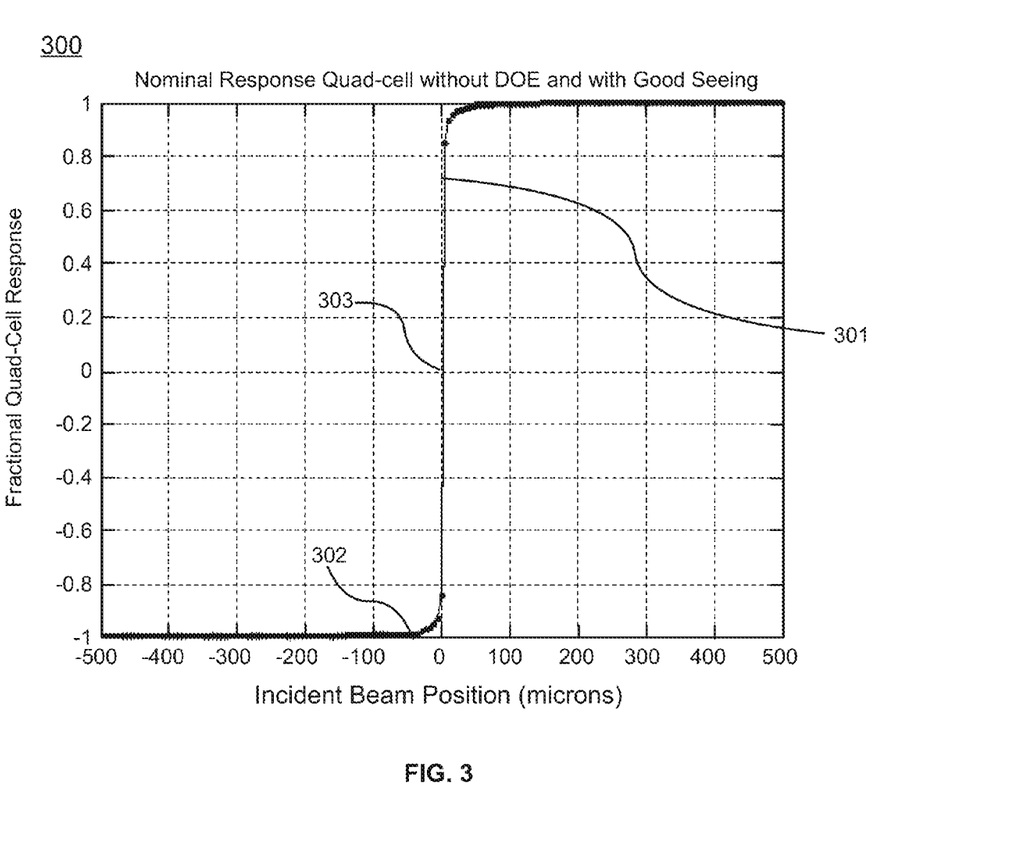
FIG. 3 is a graph illustrating an exemplary response of a quad-cell to an incident FSO signal in a system that does not include a diffractive optical element (DOE).

FIG. 3 shows a graph 300 illustrating the limited dynamic range of the transfer function 301 that is achieved by a system using a quad-cell 110 without a DOE. Under low atmospheric turbulence (e.g., when the system 100 is diffraction limited), in the absence of a DOE, the incoming FSO signal will form a small (~15 microradians full angle) diffraction limited spot on the quad-cell 110. The x-axis of the graph 300 represents the incident FSO beam's centroid position with regards to one dimension of the quad-cell 110 (e.g., the x-dimension), expressed in microns from the center of that axis. For example, the centroid may be left of center (in the bottom left or top left quadrant of the quad-cell 110) or right of center (in the bottom right or top right quadrant of the quad-cell). The y-axis of the graph 300 represents the output of the quad-cell 110 as a fractional quad-cell response, with regards to the same dimension of the quad-cell. The fractional quad-cell response is a measure of the level of the illumination of one side of the quad-cell (e.g., left, bottom) with the corresponding other side of the quad-cell (e.g., right, top). For example, point 302 illustrates that for an incident beam with a centroid position at −50 microns from the center of the quad-cell 110 in the x-dimension, the beam is almost entirely incident on the left hand side of the quad-cell, and the fractional quad-cell response is close to −1. In contrast, point 303 illustrates an incident beam at the center of the quad-cell 110 (at least with regards to the axis in question). Thus, the two sides (left and right) are equally illuminated and the fractional response is zero. Note that the majority of the curve 301 has a value of either −1 or 1, with a steep cross over around the central position (x=0). This means that, in practice, the centroid position can only be determined to be on one side (e.g., left, bottom) or the other (right, top) of the center of the quad-cell 110. Consequently, such a system, without a DOE, is not able to distinguish between a small tip-tilt error that moves the centroid of the incoming FSO signal 50 microns, and a larger tip-tilt error that moves the centroid, e.g., 500 microns.

Use of a small spot size further exacerbates this problem. A small spot size results in a steep response over a limited region of the quad-cell 110. Thus, the system will be unstable, with small fluctuations generating large corrections and/or large fluctuations generating small corrections. In either case, the system's efficiency is compromised, and in extreme cases the signal may be lost entirely (e.g., an over-correction may result in the incoming FSO signal missing the quad-cell 110 entirely). By creating a larger spot size, there is a larger region where the spot is partly incident on both sides of the quad-cell 110, and thus the relative intensity measured on each side can be used to more accurately determine the position of the centroid. The combined intensity measured by the left side of the quad-cell 110 (the top and bottom left quadrants combined) can be compared with the combined intensity measured by the right side (the top and bottom right quadrants combined) and then the position of the centroid in the x direction can be calculated from the geometry of the spot used. The same technique can be applied to the combined intensity measured for the top (top right and top left quadrants) and bottom (bottom right and bottom left quadrants) to determine the position of the centroid in the y direction.

A small spot size also presents the possibility for entrapment of a moving spot by a gap. Here, a small spot size means small relative to a larger acceptance angle of the quad-cell 110 and/or relative to the larger size of the quad-cell manufacturing gaps separating each of the quadrants of the quad cell. This can potentially interrupt feedback to the controller 170 used for FSO closed loop tip-tilt aberration correction, resulting in loss of FSO boresight pointing and stabilization. As an example, tower mounted FSO installations are subject to sway produced by the wind. A small spot size (e.g., one that is diffraction limited in size) can potentially become trapped in the gap between quad-cell quadrants if the control loop gain minimizes the control error and/or is unable to correct for tower motion. This will result in loss of optical boresight control and stabilization. Consequently, larger spot sizes are desirable to maintain the correct amount of feedback to the FSM 140 from the controller 170 to maintain pointing stability.

Figure 4:
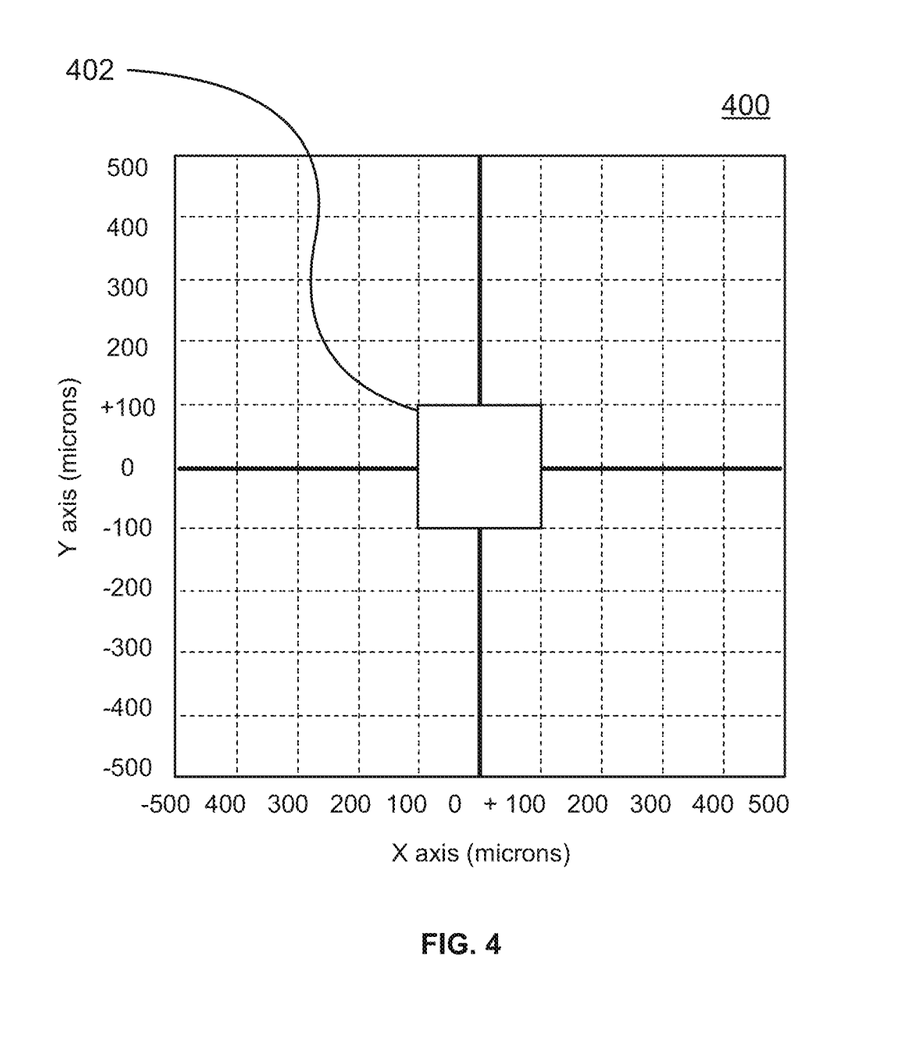
FIG. 4 is a graph illustrating the image at the quad-cell as the result of an incident FSO signal that has passed through a DOE, according to one embodiment.

FIG. 4 shows a graph 400 illustrating the image at the quad-cell 110 as the result of an incident FSO signal that has passed through a DOE 120, according to one embodiment. The DOE 120 transforms the incoming wavefront into a pattern in the far-field resulting in the image 402 at the quad-cell 110. In the embodiment shown, the DOE 120 is a computer-generated hologram and results in an image 402 that is a 200×200 micron square. The 200×200 micron image 402 maps directly into a 200×200 micron portion of the quad-cell 110. The size of the image 402 precludes the possibility of quad-cell gap entrapment. The position of the image 402 on the quad-cell 110 can be derived from the relative illumination level reported by each quadrant of the quad-cell. For example, for an image centered on the quad-cell 110, as shown in FIG. 4, the illumination of each quadrant is substantially identical. If the image 402 is moved to the right, both right hand cells will report increased illumination, while both left hand quadrants will report decreased illumination. Movement of the image 402 in other directions can be similarly determined from the change in illumination reported by each quadrant of the quad-cell 110.

A further property of the DOE 120 is that the dimensions of the resulting diffraction spot of the primary quad-cell 110 are independent of the proportion of the DOE that is illuminated. For example, if only half of the DOE 120 is illuminated due to an obstruction in the FSO signal path, the diffraction spot will remain the same shape and size, merely with reduced total intensity. Alternatively, if the DOE 120 is damaged and only a portion remains operable, the system's 100 signal-to-noise ratio will be impacted, but the system will remain operative. The size of the far-field image on the quad-cell is chosen in order to optimize sensitivity and range of the sensor. There is a trade-off between sensitivity and range, as the sensitivity drops with larger spot and the range increases with larger spots. The former follows from the fact that the minimum detectable signal is larger for a larger spot. The latter from the fact that the range, as defined as the fraction of the sensor active area on which the beam can fall resulting in a fractional response that is not equal to the limits of −1 and 1, respectively, is bigger with a bigger spot.

Although the embodiment primarily described uses a DOE 120 that results in a square image 402 being formed on the quad-cell 110, in other embodiments, other designs of DOE 120 that result in images of different dimensions and shapes are used. For example, the image 402 may be a circle with a radius of 100 microns, a 200×200 micron grid of small spots (e.g., 10 dots by 10 dots, each dot separated by 10 microns on both axes), etc.

Figure 5:
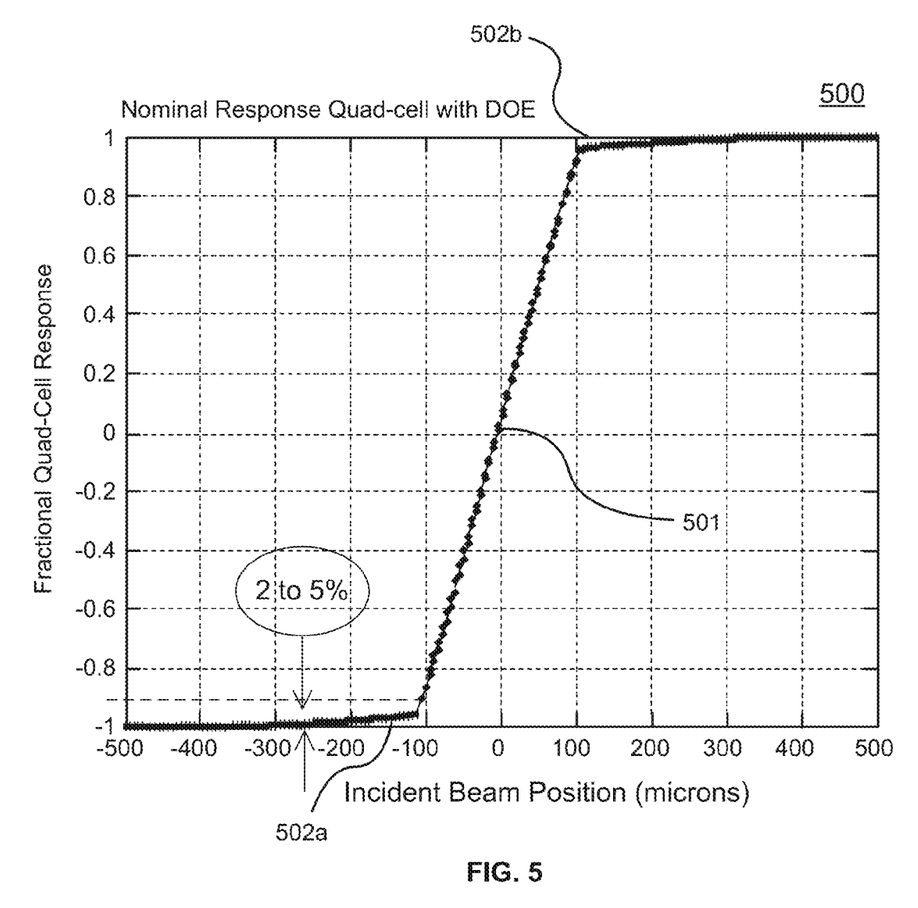
FIG. 5 is a graph illustrating an exemplary response function for a quad-cell resulting from the image shown in FIG. 4, according to one embodiment.

FIG. 5 shows a graph 500 illustrating an exemplary one-dimensional response function of a quad-cell 110 in a system 100 including a DOE 120 that results in a square image at the quad-cell 110, according to one embodiment. In the embodiment shown, the DOE 120 results in the 200×200 micron square image 402 shown in FIG. 4. Note the linearity of the output curve 401 from the quad-cell 110 in the region between −100 and 100 microns. Thus, in contrast to the results obtained without a DOE 120 (see FIG. 3), the system 100 with a DOE 120 can distinguish between a small aberration that has moved the centroid 50 microns and a larger aberration that moved the centroid 500 microns. Consequently, the dynamic response of the system 100 is improved by the addition of the DOE 120. Outside of the substantially linear region 501, some nonlinear behavior 502 can be seen. These nonlinearities 502 are associated with the internal functionality of the quad-cell 110 and are relatively small; approximately 2 to 5 percent of the full range output of the quad-cell.

Figure 6:
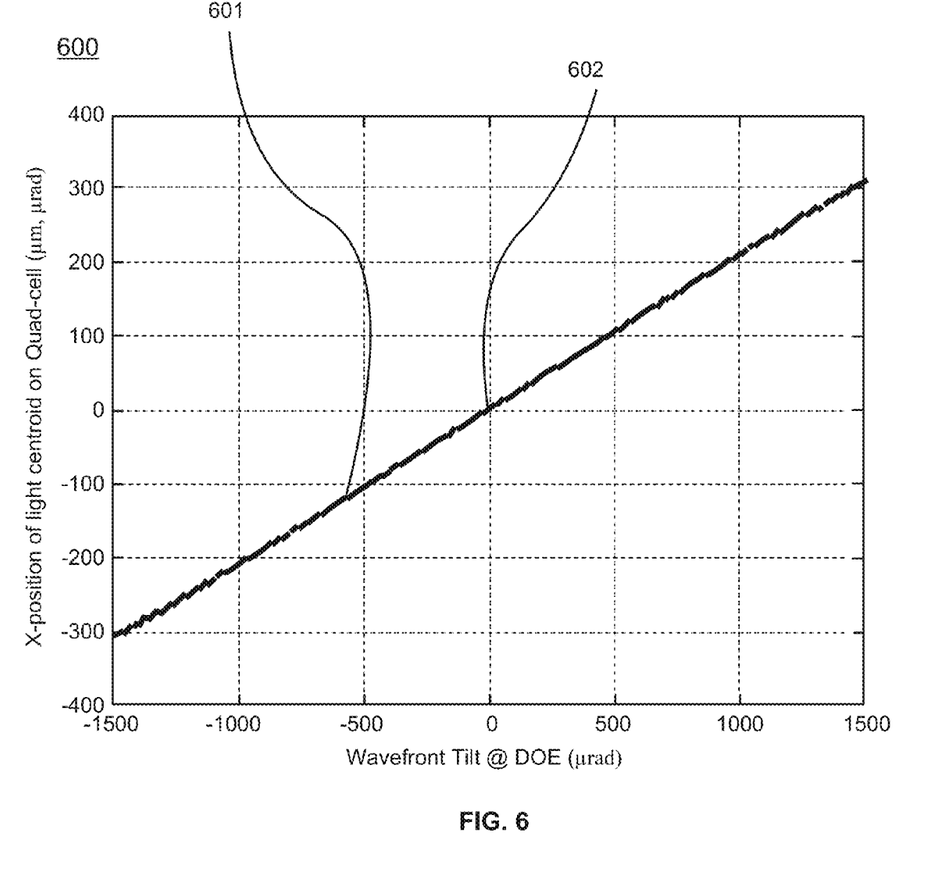
FIG. 6 is a graph illustrating the position on a quad-cell of the centroid of the optical signal as a function of the wavefront tilt of the optical signal at the DOE, according to one embodiment.

FIG. 6 shows a graph 600 illustrating the centroid position of the image 402 generated by the DOE 120 on the quad-cell 110, according to one embodiment of the system 100 where a square diffraction spot is used. The x axis of the graph 600 represents the tilt in microradians of the incoming FSO signal incident on the DOE 120. The y axis of the graph 600 represents the x position of the centroid of image 402 on the quad-cell 110. The variation in the y position of the centroid has a similar relationship with the wavefront tip of the incoming FSO signal. Note that the curve 601 is substantially linear across the range shown. Further note that when there is no wavefront tilt, the centroid of the image 402 is centered on the quad-cell 110 (see point 602).

Figure 7A:
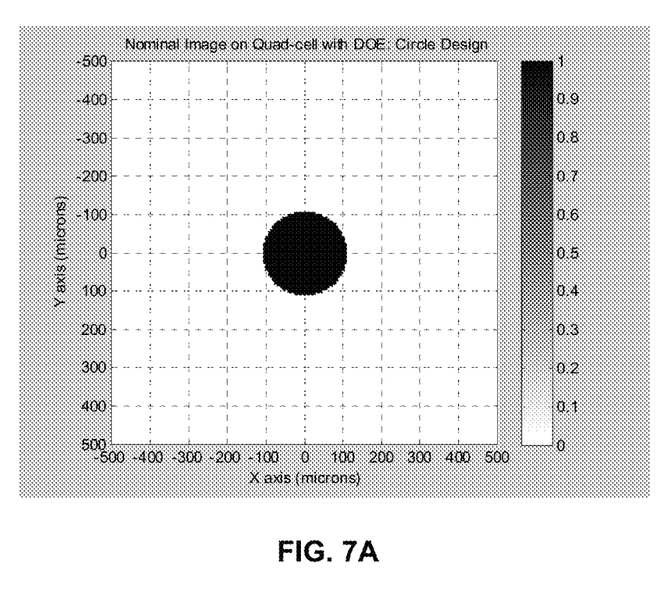
FIG. 7A is a graph illustrating the image at the quad-cell as the result of an incident FSO signal that has passed through a DOE, according to one embodiment.
Figure 7B:
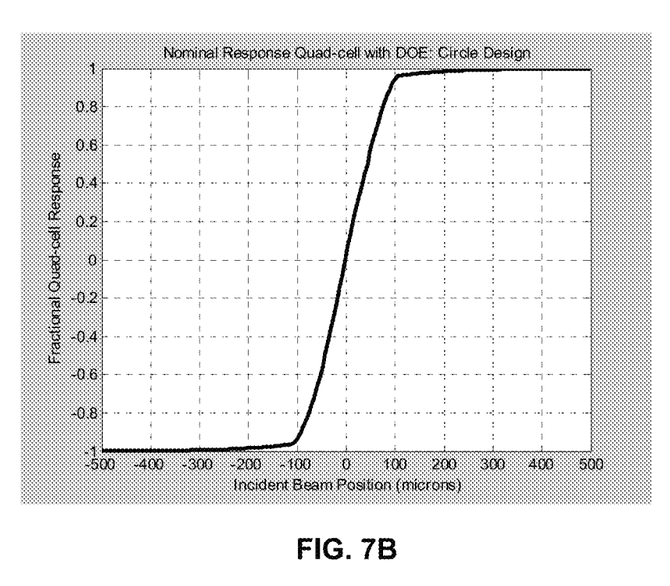
FIG. 7B is a graph illustrating an exemplary response function for a quad-cell for the image shown in FIG. 7A, according to one embodiment.
Figure 8A:
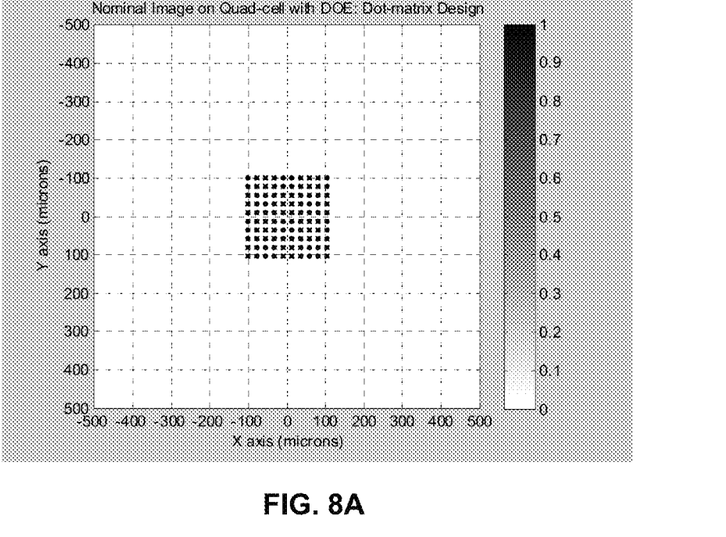
FIG. 8A is a graph illustrating the image at the quad-cell as the result of an incident FSO signal that has passed through a DOE, according to one embodiment.
Figure 8B:
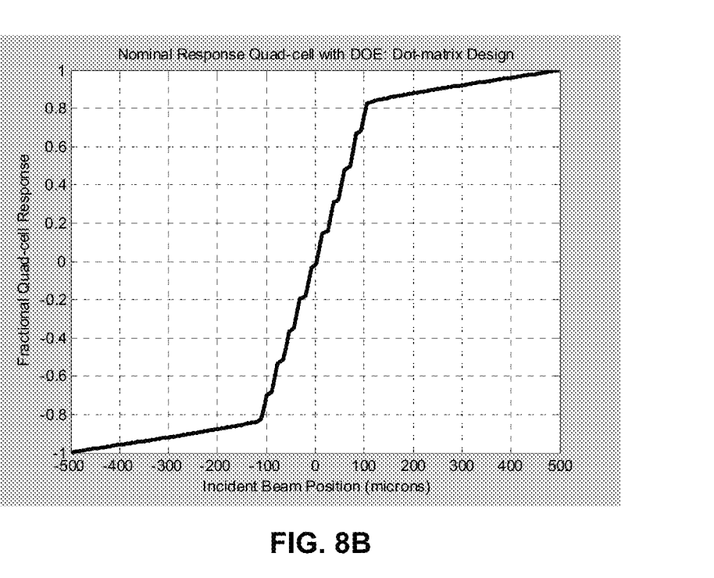
FIG. 8B is a graph illustrating an exemplary response function for a quad-cell resulting from the image shown in FIG. 8A, according to one embodiment.

Using DOEs 120 that result in images at the quad-cell 110 that are other than square produces response functions different to that illustrated by FIG. 5. For example, in contrast to the square design, which results in a response function that is very close to linear for most of the useful range, a circular design results in a response function with a constantly changing slope. FIG. 7A illustrates such a circular image and FIG. 7B illustrates the corresponding response function. Another type of DOE 120 results in an image comprising a matrix of dots, as illustrated in FIG. 8A. The response function of this design has a stair-case shape, as illustrated by FIG. 8B. Thus, the gain seen by the control loop varies based on whether the centroid is on a flat or a steep part of a step. Motion of the centroid within a flat part of a step results in virtually no change in the output of the quad-cell 110. If the size of the flat part of the step represent a significant fraction of the area of the receiver 184 in FIG. 1, the received power will change without any feed-back signal being provided to the controller 170.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system to compensate for aberrations in an incoming optical signal, comprising:
   a foreoptic assembly configured to receive the incoming optical signal;
   a diffractive optical element, optically coupled to the foreoptic assembly, configured to diffract the incoming optical signal into a patterned optical signal;
   a single quad-cell positioned such that the patterned optical signal is at least partially incident on the quad-cell illuminating an illuminated area of the quad-cell, the quad-cell configured to measure a tip-tilt aberration of the incoming optical signal based on a position of the illuminated area on the quad-cell, a size of the illuminated area on the quad-cell being larger than would be created by the incoming optical signal absent the diffractive optical element; and
   an active optical element, optically coupled to the foreoptic assembly, configured to adjust the incoming optical signal based on the aberration measured at the quad-cell.

2. The system of claim 1, further comprising:
   a detector configured to receive at least a portion of the incoming optical signal; and
   a beam splitter, optically coupled after the active optical element, the beam splitter configured to split the incoming optical signal such that a first portion propagates to the detector and a second portion propagates to the quad-cell.

3. The system of claim 1, further comprising:
   a data processing unit including a detector and a transmitter, the detector configured to receive at least a portion of the incoming optical signal and the transmitter configured to transmit an outgoing optical signal; and
   a dichroic mirror, optically coupled to the transmitter, configured to direct the outgoing optical signal to the active optical element, wherein an optical path of the outgoing optical signal is substantially the same as that of the incoming optical signal.

4. The system of claim 1, wherein the foreoptic assembly comprises a telescope.

5. The system of claim 1, wherein the active optical element comprises a fast steering mirror.

6. The system of claim 1, wherein the position of the illuminated area is determined by comparing relative illumination of quadrants of the quad-cell.

7. The system of claim 1, wherein the patterned optical signal is a rectangle of substantially invariant dimensions, regardless of a spot size of the incoming optical signal.

8. The system of claim 1, wherein the patterned optical signal a square of substantially invariant dimensions, regardless of a spot size of the incoming optical signal.

9. The system of claim 1, wherein the patterned optical signal is a circle of substantially invariant dimensions, regardless of a spot size of the incoming optical signal.

10. The system of claim 1, wherein the patterned optical signal is a grid of points of substantially invariant dimensions, regardless of a spot size of the incoming optical signal.

11. The system of claim 1, wherein the diffractive optical element is a hologram.

12. The system of claim 1, wherein the specific diffraction pattern comprises a plurality of copies of an image of the incoming optical signal.

* * * * *

UNITED STATES PATENT AND TRADEMARK OFFICE
CERTIFICATE OF CORRECTION

PATENT NO. : 9,544,052 B2
APPLICATION NO. : 13/785441
DATED : January 10, 2017
INVENTOR(S) : Malcolm J. Northcott et al.

Page 1 of 1

It is certified that error appears in the above-identified patent and that said Letters Patent is hereby corrected as shown below:

Column 9, Line 42, Claim 1, "on the quad-cell illuminating an illuminated area" to read as --on the quad-cell and illuminating an illuminated area--

Column 10, Lines 33-34, Claim 8, "optical signal a square" to read as --optical signal is a square--

Column 10, Lines 45-46, Claim 10, "specific diffraction pattern" to read as --diffraction pattern--

Signed and Sealed this
First Day of May, 2018

Andrei Iancu
*Director of the United States Patent and Trademark Office*